United States Patent [19]

Prasad

[11] 4,313,728

[45] Feb. 2, 1982

[54] VARIABLE SPEED DRIVE CLUTCH

[75] Inventor: Keni K. Prasad, Beaver Dam, Wis.

[73] Assignee: Deere & Company, Moline, Ill.

[21] Appl. No.: 122,594

[22] Filed: Feb. 19, 1980

[51] Int. Cl.³ .................. F16H 11/06; F16H 55/52
[52] U.S. Cl. ............................. 474/14; 192/105 CD
[58] Field of Search ..................... 474/11, 12, 13, 14, 474/17, 19, 50, 70, 109; 192/105 CD

[56] References Cited

U.S. PATENT DOCUMENTS

| | | | |
|---|---|---|---|
| 2,422,196 | 6/1947 | Heyer | 474/17 X |
| 3,605,510 | 9/1971 | Laughlin | 474/14 |
| 3,608,387 | 9/1971 | Fox | 474/14 |
| 3,727,478 | 4/1973 | Erickson et al. | 474/14 |
| 3,962,927 | 6/1976 | Beaudoin et al. | 474/14 |
| 3,986,406 | 10/1976 | Prasad | 474/14 |

Primary Examiner—C. J. Husar
Assistant Examiner—Moshe I. Cohen

[57] ABSTRACT

A centrifugal clutch includes a drive shaft to which a first sheave half is fixed and on which a second sheave half is axially shiftably mounted. The second sheave half forms part of a housing including a cover which is secured to an annular rim of the second sheave half by fasteners which also serve to serve to hold a plurality of equiangularly spaced ramp or cam elements against respective seats provided on support ribs forming an integral part of the second sheave half.

2 Claims, 2 Drawing Figures

VARIABLE SPEED DRIVE CLUTCH

BACKGROUND OF THE INVENTION

The present invention relates to centrifugal clutches and more specifically relates to an improvement in the manner of mounting the housing cover and ramp or cam elements of a centrifugal clutch which is generally similar to that disclosed in U.S. Pat. No. 3,986,406 granted to K. K. Prasad on Oct. 19, 1976.

Disclosed in the aforementioned patent is a centrifugal clutch having a drive shaft on which a first sheave half is fixed and on which a second sheave half is axially shiftably mounted. The second sheave half includes an annular rim and three equiangularly spaced support ribs having radially stepped, axially facing surfaces against which complimentary ramp or cam elements are seated. Each ramp is secured in place by a screw fastener. A cover is secured to the rim of the second sheave half and cooperates with the latter to define a housing which encloses the ramp elements.

While the patented design is generally satisfactory, it has been found that the ability of the ramp or cam elements to resist being torn from their mountings when subjected to relatively high centrifugal forces is somewhat less than the ability desired.

SUMMARY OF THE INVENTION

According to the present invention, there is provided an improved centrifugal clutch and more specifically there is provided an improved manner of mounting ramp or cam elements to the axially shiftable sheave half of such clutches.

It is an object of the invention to mount ramp or cam elements such that they will have a high resistance to being dislodged from their mountings when subjected to relatively high centrifugal forces.

A more specific object is to provide a mounting wherein the ramp or cam elements are sandwiched between the cover and the axially shiftable sheave half.

Yet a more specific object is to provide a mounting wherein some of the fasteners used to secure the cover to the axially shiftable sheave half are used for securing the ramp or cam elements in place.

These and other objects will become apparent from a reading of the ensuing description together with the appended drawing.

DESCRIPTION OF THE PREFERRED EMBODIMENT

Figure 1:
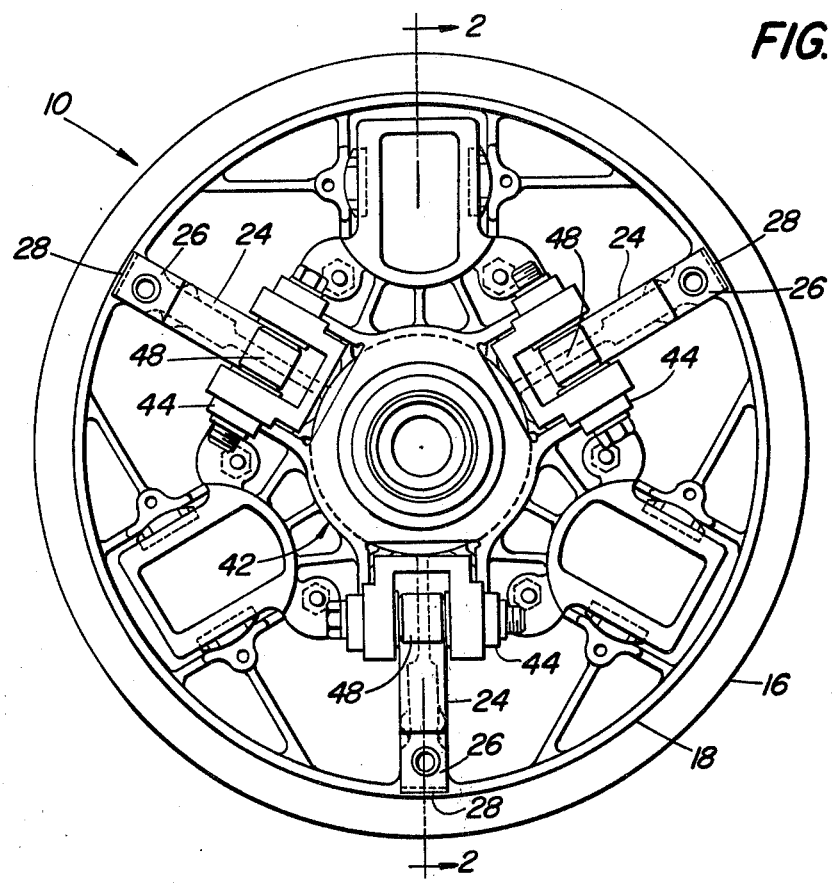
FIG. 1 is an end view of a clutch constructed in accordance with the present invention but with the cover plate removed for clarity.
Figure 2:
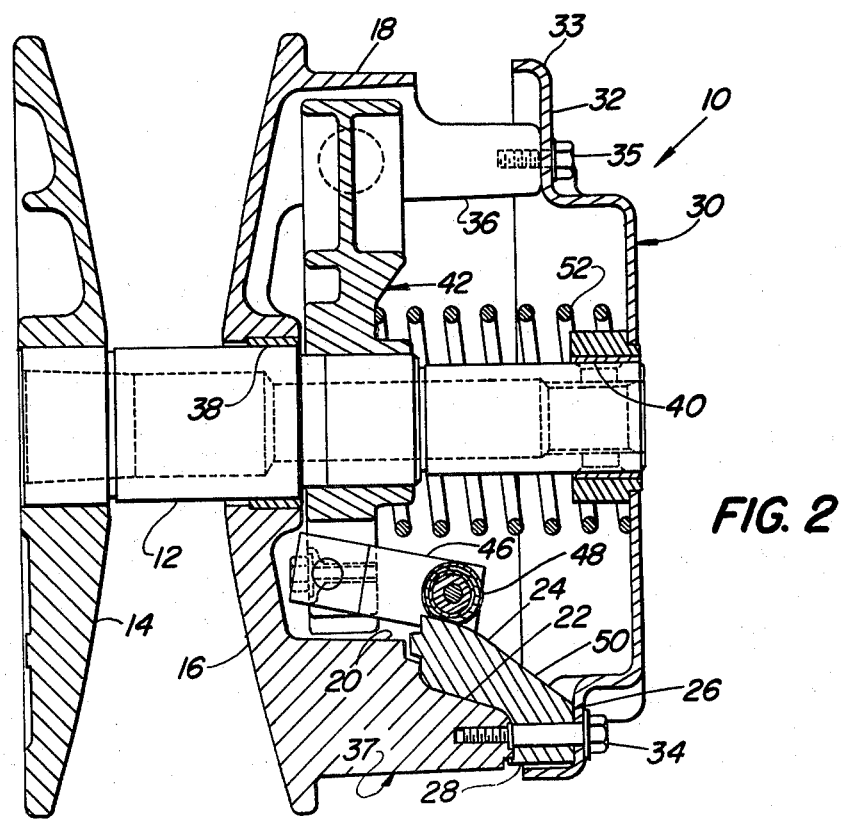
FIG. 2 is a longitudinal sectional view of the centrifugal clutch taken along line 2—2 of FIG. 1 and including the cover plate.

Referring now to the drawing, therein is shown a variable speed pulley in the form of a centrifugal clutch indicated in its entirety by the reference numeral 10. The clutch 10 includes a tubular drive shaft 12 having a first pulley or sheave half 14 fixed on one end thereof for rotation therewith while a second pulley or sheave half 16 is axially shiftably mounted on the shaft 12 beside the sheave half 14.

The sheave half 16 includes an annular rim 18 which extends axially away from the fixed sheave half 14. The sheave half 16 further includes three equiangularly spaced support ribs 20 which extend radially relative to the shaft 12 and are joined to the rim 18.

Each of the support ribs 20 is provided with a generally radially outwardly stepped surface 22 facing axially away from the fixed sheave half 14. Seated against each of the surfaces 22 is a complementary shaped ramp or cam element 24 having an outer end portion defined by a radially extending surface 26 and a contiguous axially extending surface 28, the latter being substantially flush with the outer surface of the rim 18. A sheet metal cover 30 extends radially from the shaft 12 and includes a stepped end portion including a first section 32 positioned against the surfaces 26 of the ramp elements 24 and a second section 33 disposed adjacent the surfaces 28 of the ramp elements. A plurality of fasteners 34 extend through respective sets of aligned holes in the cover 30, outer end portions of the ramp element 24 and into respective threaded holes in the ribs 20. Thus the fasteners 34 act to sandwich the ramp or cam elements 24 between the cover 30 and the sheave half 16. Further fasteners 35 extend through the cover and into further support ribs 36.

The sheave half 16 and cover 30 cooperate to form a housing 37 which is supported on the shaft 12 via spaced bearings 38 and 40.

Located within the housing 37 and fixed to the shaft 12 is a spider 42 having three equiangularly spaced support ears 44 on which flyweights 46 are respectively mounted. The angular disposition of the spider 42 is such that the ears 44 are in angular correspondence to the ramp or cam elements 24 and the flyweights 46 respectively include rollers 48 which engage axially and radially inclined surfaces 50 of the elements 24.

A coil compression spring 52 is mounted on the shaft 12 within the housing 37 and is disposed to bias the cover 30 away from the spider 42 and hence to bias the sheave half 16 away from the sheave half 14.

It will be appreciated then, that upon the shaft 12 being rotated faster and faster, the flyweights 46 will swing outwardly and the rollers 48 will act on the ramp elements 24 such as to urge the sheave half 16 towards the sheave half 14 against the force of the spring 52.

The same centrifugal forces which operate the flyweights 46 also operate on each and every component of the clutch 10. It has been found that the effects of such forces on the ramp elements 24 are lessened where the elements 24 are sandwiched between the cover 30 and sheave half 16 in contrast to designs where the ramp elements are mounted separately from the cover, as illustrated in the aforementioned U.S. Pat. No. 3,986,406, for example.

I claim:

1. In a variable speed pulley including a drive shaft, a first pulley half fixed to the shaft for rotation therewith; a housing axially shiftably mounted on the shaft beside the first pulley half and defined in part by a second pulley half having an annular rim extending axially away from the first pulley half and a cover member extending radially from the shaft and being releasably secured to the annular rim, and a plurality of equiangularly spaced ramp elements being releasably secured to respective support ribs joined to and located radially inward of the annular rim, the improvement comprising: said ramp elements each having a radially outer end portion engaged with the annular rim and the cover member and a plurality of fasteners each extending through the cover member and radially outer end portions of the ramp elements and into the support ribs to thereby releasably secure the cover and ramp elements to the support ribs.

2. In a variable speed pulley including a drive shaft, a first sheave half fixed on the shaft, a second sheave half axially shiftably mounted on the shaft beside the first sheave half and including an annular rim extending axially away from the first sheave, a spider member fixed to the shaft within the annular rim, a plurality of flyweights mounted on the spider at equally spaced angular locations and including rollers, a plurality of stepped surface portions located on the inside of the annular rim at angular locations coinciding with those of the flyweights, a plurality of ramp elements respectively shaped complementary to and seated in the stepped surface portions and including radially outer end portions forming axial extensions of the rim, a plurality of fasteners respectively extending through the outer end portions of the ramp elements for securing the latter in place against the plurality of stepped surfaces, a wall releasably secured to the annular rim and cooperating therewith to form a housing enclosing the spider and flyweights, and a compression spring acting between the spider and the cover for biasing the second sheave half away from the first sheave half, the improvement comprising, said wall being seated against the outer end portions of the ramp elements and said plurality of fasteners also serving to releasably secure the wall to the annular rim.

* * * * *